United States Patent [19]
Nakamura et al.

[11] Patent Number: 5,831,269
[45] Date of Patent: Nov. 3, 1998

[54] RADIATION DETECTOR ELEMENT

[75] Inventors: Ryouhei Nakamura, Tokorozawa; Nobuyuki Yamada, Hanyu, both of Japan

[73] Assignee: Hitachi Metals, Ltd., Tokyo, Japan

[21] Appl. No.: 756,692

[22] Filed: Nov. 26, 1996

[30] Foreign Application Priority Data

Nov. 29, 1995 [JP] Japan ................................. 7-310403
Sep. 20, 1996 [JP] Japan ................................. 8-250603

[51] Int. Cl.$^6$ ........................................... G01T 1/20
[52] U.S. Cl. ................... 250/367; 250/368; 250/370.11
[58] Field of Search ........................... 250/367, 370.09, 250/370.11, 366, 368

[56] References Cited

U.S. PATENT DOCUMENTS

| | | | |
|---|---|---|---|
| 4,525,628 | 6/1985 | DiBianca et al. | 250/367 |
| 4,694,177 | 9/1987 | Akai | 250/368 |
| 4,870,667 | 9/1989 | Brunnett et al. | |

FOREIGN PATENT DOCUMENTS

| | | | |
|---|---|---|---|
| 63-9881 | 1/1988 | Japan | 250/367 |
| 274890 | 3/1990 | Japan . | |

*Primary Examiner*—Edward J. Glick
*Assistant Examiner*—Darren M. Jiron
*Attorney, Agent, or Firm*—Sughrue, Mion, Zinn, Macpeak & Seas, PLLC

[57] ABSTRACT

A radiation detector element which comprises a scintillator laminate for converting X-ray energy incident on said radiation detector to visible light, the scintillator laminate comprising a ceramic scintillator layer and a single crystal scintillator layer and a photodetector for converting the visible light from the scintillator laminate to electrical signals. The single crystal scintillator is interposed in the path of the light scintillations from the ceramic scintillator to the photodetector.

12 Claims, 2 Drawing Sheets

RADIATION DETECTOR ELEMENT

BACKGROUND OF THE INVENTION

The present invention relates to a radiation detector for detecting X-ray, more particularly, to a radiation detector element for use in an X-ray computed tomography.

A computed tomography is one of the medical diagnostic methods using X-ray. An apparatus for computed tomography comprises an X-ray tube emitting X-ray fan beams and an radiation detector composed of an array of radiation detecting elements. The X-ray tube and the radiation detector are positioned opposite to each other with respect to the cross-sectional slice of a subject under examination. In computed tomography, the X-ray tube transmits fan beam X-rays through the subject under examination and the intensity of the radiation passing through the subject is measured by the radiation detector on an opposite side.

The energy of the X-ray incident on a scintillator in the radiation detector is exponentially attenuated according to Lambert's Law. When the energy of the incident X-ray is absorbed, the scintillator emits light having energy proportional to the absorbed energy. The output level of the scintillator is expressed by an integrated energy of the emitted light received by a photodetector.

The X-ray tube is rotated by a fixed angle about the subject under examination after one measurement and before the next measurement, and X-ray absorption data are obtained from a number of directions. A computer system analyzes the data and calculates the absorption variations inside the cross-sectional slice of the subject to reconstruct an image corresponding to the absorption variations.

The radiation detectors conventionally used in computer tomography utilize a combination of a $CdWO_4$ single crystal scintillator and a silicon photodiode, or a combination of a $Bi_6Ge_4O_{12}$ single crystal scintillator and a photomultiplier.

However, the $CdWO_4$ single crystal scintillator has a relatively low luminescence efficiency, and therefore, the output signal from the scintillator has a low SIN ratio to make it difficult to reconstruct a high resolution image when a subject having a high X-ray absorbance or a large-sized machinery is examined by computed tomography. Other single crystal scintillators may include those comprising NaI, CsI, etc. Although these scintillators are more sensitive to X-ray than the $CdWO_4$ single crystal scintillator, not suitable for use in computer tomography because they are deliquescent and show a large amount of afterglow.

A ceramic scintillator such as $Gd_2O_2S$:Pr, etc. has a high luminescence efficiency to X-ray, and shows a slight afterglow and no deliquescence. However, the ceramic scintillator is less transmissive than the single crystal scintillator with respect to visible light. Since a high energy X-ray is highly penetrable, the scintillator is required to be thick in view of obtaining a high energy conversion efficiency. Although the luminescence efficiency in the ceramic scintillator increases with increasing thickness, the light transmission through the ceramic scintillator decreases with increasing thickness. This reduces the amount of light reaching a photodetector to result in a low output level. Thus, the ceramic scintillator has the same problem as in the case of the $CdWO_4$ single crystal scintillator.

In the radiation detector comprising a combination of the $Bi_6Ge_4O_{12}$ single crystal scintillator and the photomultiplier, a high light-sensitivity of the photomultiplier compensates for a low luminescence efficiency of the $Bi_6Ge_4O_{12}$ single crystal scintillator to attain a high sensitivity. However, since the photomultiplier is difficult to be reduced in its geometric size, the detector element unfavorably suffers from a large size which in turn makes it difficult to obtain a high resolution of image of the cross-sectional slice.

OBJECT AND SUMMARY OF THE INVENTION

Accordingly, an object of the present invention is to provide a radiation detector element, mainly for use in X-ray computer tomography, which is highly sensitive to X-ray and capable of reconstructing a high resolution image of a cross-sectional slice of a subject having a high X-ray absorbance or a large machinery.

As a result of the intense research in view of the above objects, the inventors have found that a radiation detector element comprising a combination of a ceramic scintillator having a high luminescence efficiency and a single crystal scintillator being highly transmissive to visible light shows a high luminescence efficiency and a high conversion efficiency of X-ray energy.

Thus, in a first aspect of the present invention, there is provided a radiation detector element comprising (1) a scintillator laminate for converting X-ray energy incident on the radiation detector to visible light, the scintillator laminate comprising a ceramic scintillator layer and a single crystal scintillator layer, and (2) a photodetector for converting the visible light from the scintillator laminate to electrical signals.

The foregoing and other objects, features and advantages of the invention will be apparent from the following detailed description of the invention as illustrated in the accompanying drawings, in which like reference numerals indicate like elements.

DETAILED DESCRIPTION OF THE INVENTION

The ceramic scintillator used in the present invention has a polycrystalline structure, which may be produced, for example, by sintering ceramic powder. The scintillation material is preferably at least one selected from the group consisting of $Gd_2O_2S$:Pr, $Gd_2O_2S$:Eu and $Gd_2O_2S$:Tb, or at least one selected from the group consisting of $(Y, Gd)_2O_3$:Eu and $Gd_3Ga_5O_{12}$:Cr. The ceramic scintillator enhances the sensitivity of the radiation detector element due to its high luminescence efficiency to X-rays.

The scintillation material for the single crystal scintillator is at least one selected from the group consisting of $CdWO_4$ and $Bi_6Ge_4O_{12}$. The single crystal scintillator serves as a waveguide for effectively transmitting the lights emitted from the ceramic scintillator to the photodetector, and is preferred to have a light transmittance over 30% with respect to visible lights. When less than 30%, the transmitting amount of the lights is insufficient, thus resulting in failure to be put into practical use. Since the single crystal scintillator also converts the incident X-rays to visible lights, the total energy conversion efficiency of the radiation detector element can be more improved.

Figure 1:
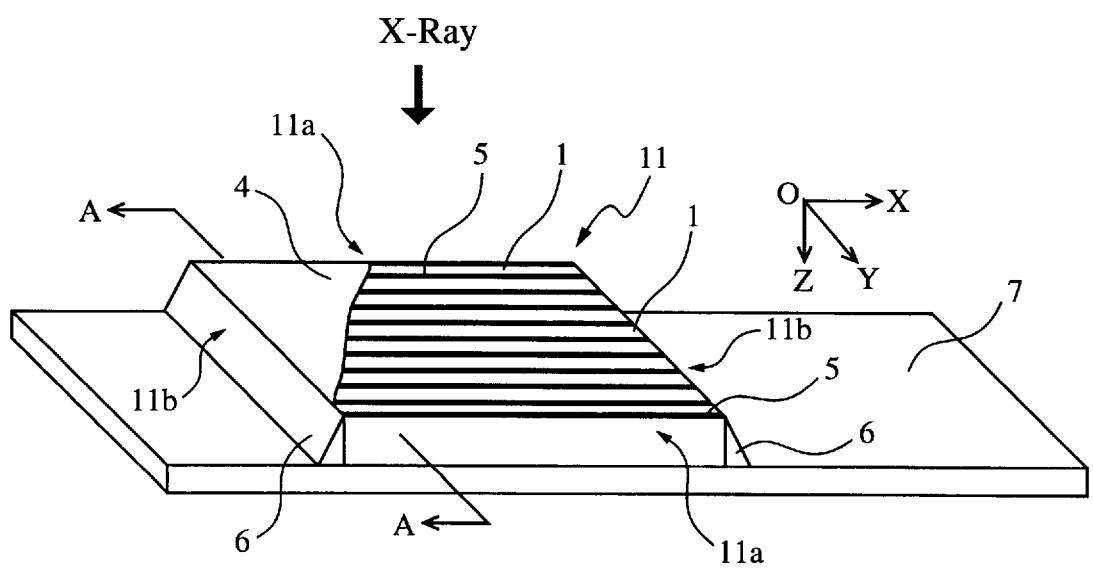
FIG. 1 is a perspective view showing a radiation detector having an array of the radiation detector elements of the present invention.

FIG. 1 is a perspective view, partially broken away, showing a structure of the radiation detector having an array of the radiation detector elements of the present invention.

The radiation detector 11 is formed on a substrate 7 made of a plastic such as a glass-reinforced epoxy rein, etc. Between the substrate 7 and each ceramic scintillator 1 having a length of 10 to 50 mm in the x direction, a width of 0.5 to 3 mm in the y direction and a thickness of 1.0 to 3.0 mm in the z direction, are sequentially disposed a single crystal scintillator 2 and a photodetector 3 (both are in hiding) along the X-ray path (in the z direction) so that the single crystal scintillator 2 is positioned upstream in the X-ray path with respect to the photodetector 3. The single crystal scintillator 2 and the photodetector 3 has a length and a width each substantially the same as those of the ceramic scintillator 1. The thickness of the single crystal scintillator 2 is 0.2 to 10 mm. Between the adjacent scintillator laminates comprising the ceramic scintillator 1 and the single crystal scintillator 2, a reflective plate 5 having a length substantially the same as that of the ceramic scintillator 1 and a width of 0.2 to 2 mm is disposed so as to cover the lengthwise extending side surface of the scintillator laminate. The material for the reflective plate 5 is selected from Mo, W, Cu, brass, etc. The reflective plate 5 is also provided on each of surfaces 11a, 11a of the scintillator laminates at both the terminal ends of the array. Each of end surfaces 11b, 11b is covered with a reflective plate 6 made of $TiO_2$,MgO, $BaSO_4$, etc. The upper surface of the radiation detector 11 is coated with a reflecting material 4 such as $TiO_2$, MgO, $BaSO_4$, Al, Ag, etc.

Figure 2:
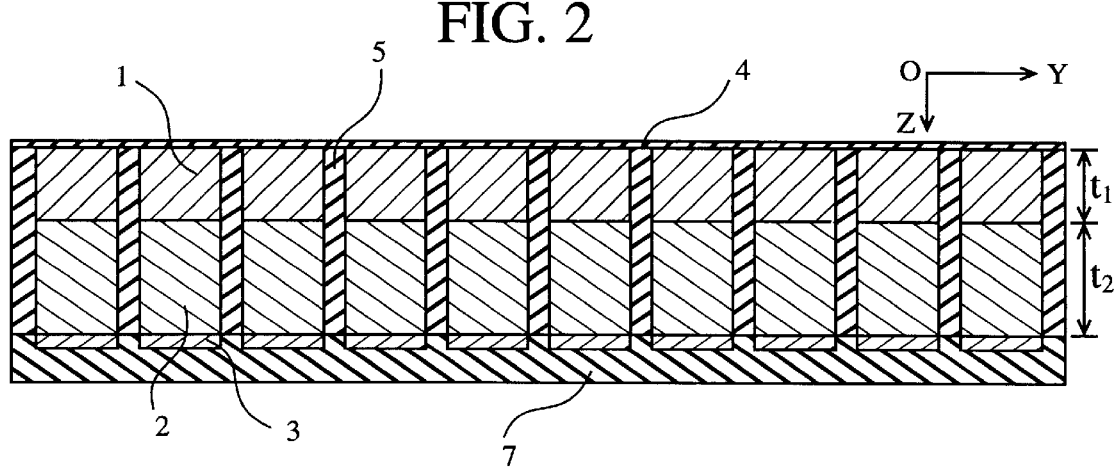
FIG. 2 is a cross-sectional view taken along the A—A line in FIG. 1.

FIG. 2 is a cross-sectional view taken along the A—A line of FIG. 1. As seen from FIG. 2, the ceramic scintillator 1 having a high luminescence efficiency is positioned upstream in the X-ray path with respect to the single crystal scintillator 2. The radiation from the source first impinges on the ceramic scintillator 1 where a portion of radiation is converted to visible light which is in turn transmitted to the photodetector 3 through the single crystal scintillator 2 serving as a waveguide. The radiation passing through the ceramic scintillator 1 is absorbed in the single crystal scintillator 2 to be converted to visible light. The light scintillations from the ceramic scintillator 1 and the single crystal scintillator 2 are combinedly detected by the photodetector 3 which is made of silicon photodiode, amorphous silicon photodiode, etc. The thickness ratio ($t_2/t_1$), along the X-ray path, of the thickness ($t_2$) of the single crystal scintillator 2 to the thickness ($t_1$) of the ceramic scintillator 1 is preferably 0.2 to 10 in view of obtaining sufficient effect of waveguide by the single crystal scintillator 2. When the ratio is less than 0.2, the output level cannot be increased by the single crystal scintillator 2. When the ratio exceeds 10, the transmitting amount of the lights through the single crystal scintillator 2 becomes too small, thus decreasing the output level of the scintillator. With the structure described above, the conversion efficiency of X-ray energy to visible light and the sensitivity to X-ray can be enhanced. In the embodiment shown by FIG. 2, the photodetector 3 is embedded in the substrate 7, however, the embedding is not critical in the present invention.

Figure 3:
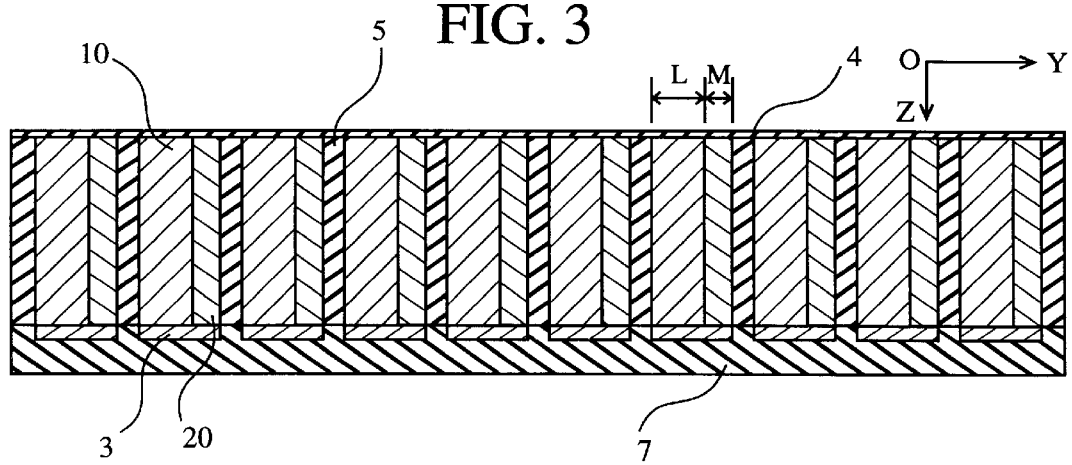
FIG. 3 is a cross-sectional view showing another structure of the radiation detector having an array of the radiation detector elements of the present invention.

FIG. 3 is a cross-sectional view showing another embodiment of the present invention. In FIG. 3, a scintillator laminate of a ceramic scintillator 10 and a single crystal scintillator 20 is positioned in parallel in the X-ray path. The lower or downstream surfaces of the scintillator 10 and the single crystal scintillator 20 contact the upper or upstream surface of the photodetector 3. In the radiation detector element of such a structure, the light scintillations from the ceramic scintillator 10 are transmitted to the photodetector 3 directly or through the adjacent single crystal scintillator 20. The light scintillations resulting from the single crystal scintillator 20 are also transmitted to the photodetector 3 directly. Therefore, like the structure shown in FIG. 2, the structure of FIG. 3 also provides the radiation detector with a high energy conversion efficiency and a high sensitivity to X-ray.

The ratio of the width (M) of single crystal scintillator 20 to the width (L) of ceramic scintillator 10, both in the y direction, depends on the resolution required in each application field, and preferably the ratio (M/L) is 0.1–2.0. When the ratio is less than 0.1, the waveguide by the single crystal scintillator 20 is insufficient to reduce the energy conversion efficiency of the radiation detector. When the ratio exceeds 2.0, the area of X-ray receiving surface of the ceramic scintillator 10 is too small to obtain a sufficient output of the radiation detector.

The interface between the ceramic scintillator layer and the single crystal scintillator layer, or between the single crystal scintillator layer and the photodetector is preferred to be light transmissive. Therefore, when the scintillator laminate is formed by bonding a ceramic scintillator plate and a single crystal scintillator plate with an adhesive, or when the scintillator laminate is bonded to the photodetector by an adhesive, the adhesive is preferred to be a light-transmissive type.

In FIGS. 1–3, the ceramic scintillator 1 or 10 and the single crystal scintillator 2 or 20 are in the shape of rectangular plate. However, it should be noted that the geometric shape and size thereof are not restricted to such specific embodiment and may be varied or modified without departing from the scope of the present invention.

As described above, in the radiation detector element of the present invention, a single crystal scintillator is interposed in the path of light scintillations from a ceramic scintillator to the photodetector. The light scintillations from the ceramic scintillator is transmitted to the photodetector with minimum loss due to a high transmissivity to visible lights of the single crystal scintillator to result in an improved sensitivity to X-ray of the radiation detector.

The method for fabricating the radiation detector element and the method for assembling a plurality of the elements to a radiation detector are not a part of the present invention. It will be recognized by one of ordinary skill in the art that the radiation detector element or a radiation detector can be fabricated from known materials by any of the known fabricating process or by any of the known assembling process.

The present invention will be further described while referring to the following Examples which should be considered to illustrate various preferred embodiments of the present invention.

EXAMPLE 1

A radiation detector having the structure of FIG. 2 was prepared as follows.

A rectangular plate for the ceramic scintillator having a width (y direction) of 1.6 mm, a length (x direction) of 30 mm and a thickness (z direction) of 1.2 mm was prepared from a polycrystalline $Gd_2O_2S$:Pr. Separately, another rectangular plate for the single crystal scintillator having a width (y direction) of 1.6 mm, a length (x direction) of 30 mm and a thickness (z direction) of 1.8 mm was prepared from $CdWO_4$. Both the plates were bonded each other by a light-transmissive epoxy adhesive to obtain a scintillator laminate. A plurality of the scintillator laminates were bonded to silicon photodiodes by adhesive of the same type as above. Each of the side surface of the scintillator laminates was covered with Mo plate (reflective plate) and the upper surface thereof was coated with a powdery $TiO_2$. On both the end surface of the scintillator array were covered with $TiO_2$ plate.

The output characteristics of the radiation detector thus produced were measured by using a continuous X-ray (tube voltage: 400 kV, tube current: 4 mA). The result is shown in Table 1.

Examples 2–3

The same procedures as in Example 1 were repeated except for changing the polycrystalline $Gd_2O_2S:Pr$ to a polycrystalline $Gd_2O_2S:Eu$ (Example 2) and a polycrystalline $Gd_2O_2S:Tb$ (Example 3). The results of measuring the output characteristics are shown in Table 1.

Examples 4–6

Each radiation detector having the structure of FIG. 3 was prepared substantially in accordance with the procedures of Example 1 while using a rectangular plate for the ceramic scintillator having a width (y direction) of 1.0 mm, a length (x direction) of 30 mm and a thickness (z direction) of 3.0 mm and a rectangular plate for the single crystal scintillator having a width (y direction) of 0.6 mm, a length (x direction) of 30 mm and a thickness (z direction) of 3.0 mm. The scintillator material for the ceramic scintillator was $Gd_2O_2S:Pr$ (Example 4), $Gd_2O_2S:Eu$ (Example 5) or $Gd_2O_2S:Tb$ (Example 6). The scintillator material for the single crystal scintillator was $CdWO_4$ for Examples 4–6.

The results of measuring the output characteristics in the same manner as in Example 1 are shown in Table 1.

Comparative Example

Figure 4:
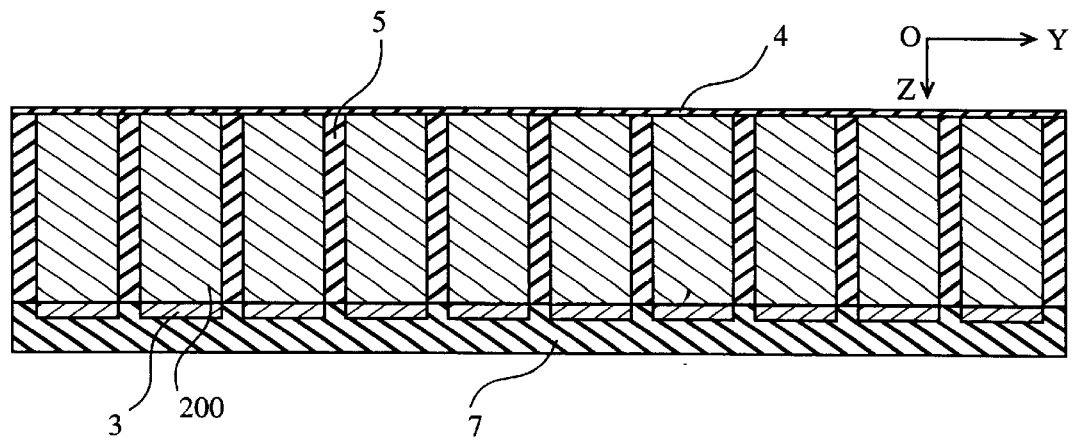
FIG. 4 is a cross-sectional view showing the structure of prior art radiation detector.

A radiation detector having the structure of FIG. 4 was prepared in the same manner as in Example 1 except for using only a rectangular plate of $CdWO_4$ single crystal scintillator having a width (y direction) of 1.6 mm, a length (x direction) of 30 mm and a thickness (z direction) of 3.0 mm.

The results of measuring the output characteristics in the same manner as in Example 1 are shown in Table 1.

TABLE 1

| | Ceramic Scintillator | Single Crystal Scintillator | Structure | Relative Output |
|---|---|---|---|---|
| Example 1 | $Gd_2O_2S:Pr$ | $CdWO_4$ | FIG. 2 | 1.8 |
| Example 2 | $Gd_2O_2S:Eu$ | $CdWO_4$ | FIG. 2 | 2.5 |
| Example 3 | $Gd_2O_2S:Tb$ | $CdWO_4$ | FIG. 2 | 1.8 |
| Example 4 | $Gd_2O_2S:Pr$ | $CdWO_4$ | FIG. 3 | 1.5 |
| Example 5 | $Gd_2O_2S:Eu$ | $CdWO_4$ | FIG. 3 | 2.0 |
| Example 6 | $Gd_2O_2S:Tb$ | $CdWO_4$ | FIG. 3 | 1.5 |
| Comparative Example | — | $CdWO_4$ | FIG. 4 | 1.0 |

As seen from Table 1, the radiation detectors of the present invention showed sensitivity to X-ray, evaluated by relative output, 1.5 to 2.5 times higher than that of Comparative Example. It would appear that the combination of the ceramic scintillator and the single crystal scintillator provides a much higher sensitivity to X-ray as compared with the sole use of the single crystal scintillator.

Examples 7–12

The procedures of Examples 1–6 were repeated except for using $Bi_6Ge_4O_2$ in place of $CdWO_4$. Nearly the same output levels as those of Examples 1–6 were obtained in each radiation detector.

Examples 13–14

The procedures of Example 1 were repeated except for using a polycrystalline $(Y, Gd)_2O_3:Eu$ (Example 13) or a polycrystalline $Gd_3Ga_5O_{12}:Cr$ (Example 14) as the ceramic scintillator. Nearly the same output levels as those of Examples 1–6 were obtained in each radiation detector.

Examples 15–16

The procedures of Example 4 were repeated except for using a polycrystalline $(Y, Gd)_2O_3:Eu$ (Example 13) or a polycrystalline $Gd_3Ga_5O_{12}:Cr$ (Example 14) as the ceramic scintillator. Nearly the same output levels as those of Examples 1–6 were obtained in each radiation detector.

TABLE 2

| | Ceramic Scintillator | Single Crystal Scintillator | Structure | Relative Output |
|---|---|---|---|---|
| Example 7 | $Gd_2O_2S:Pr$ | $Bi_6Ge_4O_{12}$ | FIG. 2 | 1.6 |
| Example 8 | $Gd_2O_2S:Eu$ | $Bi_6Ge_4O_{12}$ | FIG. 2 | 2.2 |
| Example 9 | $Gd_2O_2S:Tb$ | $Bi_6Ge_4O_{12}$ | FIG. 2 | 1.6 |
| Example 10 | $Gd_2O_2S:Pr$ | $Bi_6Ge_4O_{12}$ | FIG. 3 | 1.3 |
| Example 11 | $Gd_2O_2S:Eu$ | $Bi_6Ge_4O_{12}$ | FIG. 3 | 1.8 |
| Example 12 | $Gd_2O_2S:Tb$ | $Bi_6Ge_4O_{12}$ | FIG. 3 | 1.3 |
| Example 13 | $(Y, Gd)_2O_3:Eu$ | $CdWO_4$ | FIG. 2 | 2.4 |
| Example 14 | $Gd_3Ga_5O_{12}:Cr$ | $CdWO_4$ | FIG. 2 | 1.5 |
| Example 15 | $(Y, Gd)_2O_3:Eu$ | $CdWO_4$ | FIG. 3 | 2.1 |
| Example 16 | $Gd_3Ga_5O_{12}:Cr$ | $CdWO_4$ | FIG. 3 | 1.3 |

What is claimed is:

1. A radiation detector comprising an array of radiation detecting elements on a substrate, said radiation detecting elements each comprising:

a scintillator laminate for converting X-ray energy incident thereon to visible light and transmitting said visible light, said scintillator laminate comprising a ceramic scintillator layer and a single crystal scintillator layer; and a photodetector for converting said visible light from said scintillator laminate to electrical signals;

said ceramic scintillator layer and said single crystal scintillator layer being disposed serially on said photodetector along a path of incident X-ray so that said ceramic scintillator layer is positioned upstream in said path of incident X-ray with respect to said single crystal scintillator layer.

2. The radiation detector according to claim 1, wherein said ceramic scintillator layer comprises at least one scintillation material selected from the group consisting of $Gd_2O_2S:Re$ wherein Re is Pr, Eu or Tb.

3. The radiation detector according to claim 1, wherein said ceramic scintillator layer comprises at least one scintillation material selected from the group consisting of $(Y, Gd)_2O_3:Eu$ and $Gd_3Ga_5O_{12}:Cr$.

4. The radiation detector according to claim 1, wherein said single crystal scintillator layer comprises at least one scintillation material selected from the group consisting of $CdWO_4$ and $Bi_6Ge_4O_{12}$.

5. The radiation detector according to claim 1, wherein a ratio of the thickness of said single crystal scintillator layer to the thickness of said ceramic scintillator layer along said path of incident X-ray is 0.2–10.

6. The radiation detector according to claim 1, wherein a reflective plate is disposed between adjacent scintillator laminates.

7. A radiation detector comprising an array of radiation detecting elements on a substrate, said radiation detecting elements each comprising:

a scintillator laminate for converting X-ray energy incident thereon to visible light and transmitting said visible light, said scintillator laminate comprising a ceramic scintillator layer and a single crystal scintillator layer; and a photodetector for converting said visible light from said scintillator laminate to electrical signals;

said scintillator laminate being disposed on said photodetector so that said ceramic scintillator layer and said single crystal scintillator layer are positioned in parallel to each other along a-path of incident X-ray.

8. The radiation detector according to claim 7, wherein said ceramic scintillator layer comprises at least one scintillation material selected from the group consisting of $Gd_2O_2S$:Re wherein Re is Pr, Eu or Tb.

9. The radiation detector according to claim 7, wherein said ceramic scintillator layer comprises at least one scintillation material selected from the group consisting of (Y, $Gd)_2O_3$:Eu and $Gd_3Ga_5O_{12}$:Cr.

10. The radiation detector according to claim 7, wherein said single crystal scintillator layer comprises at least one scintillation material selected from the group consisting of $CdWO_4$ and $Bi_6Ge_4O_{12}$.

11. The radiation detector according to claim 7, wherein a ratio of the width of said single crystal scintillator layer to the width of said ceramic scintillator layer along the laminating direction is 0.1–2.0.

12. The radiation detector according to claim 7, wherein a reflective plate is disposed between adjacent scintillator laminates.

* * * * *